United States Patent [19]

Bargellini

[11] Patent Number: 4,989,289
[45] Date of Patent: Feb. 5, 1991

[54] CLEANING EQUIPMENT SUCH AS A MOP, MADE OF STRIPS OF ABSORBING MATERIAL

[76] Inventor: Andrea Bargellini, Via Parigi No. 15, 50065 Pontassieve, Firenze, Italy

[21] Appl. No.: 86,493

[22] Filed: Aug. 17, 1987

[30] Foreign Application Priority Data

Sep. 2, 1986 [IT] Italy .................................. 9468 A/86

[51] Int. Cl.⁵ .............................................. A47L 13/20
[52] U.S. Cl. ...................................... 15/229.1; 15/193; 300/21
[58] Field of Search ................. 15/147 R, 159 R, 168, 15/190, 159 A, 228, 229.1, 229.2, 193, 191 R, 229.6, 176.1, 176.2, 192; 300/16, 21

[56] References Cited

U.S. PATENT DOCUMENTS

| | | | |
|---|---|---|---|
| 636,144 | 10/1899 | Hotchner | 15/191 R |
| 957,331 | 5/1910 | Hascy | 15/191 R |
| 2,317,110 | 4/1943 | Person | 15/193 |
| 2,664,316 | 12/1953 | Winslow | 15/191 R X |
| 3,120,671 | 2/1964 | Miller | 15/191 R |
| 3,136,582 | 6/1964 | Locher | 15/193 |
| 3,152,350 | 10/1964 | Vosbikian | 15/229.1 |
| 3,335,443 | 8/1967 | Parisi | 15/193 X |
| 3,434,176 | 3/1969 | Cazet | 15/147 R X |
| 3,675,265 | 7/1972 | Landen | 15/193 |
| 4,250,589 | 2/1981 | Alvin | 15/193 |
| 4,487,565 | 12/1984 | Simms et al. | 15/193 X |
| 4,525,890 | 7/1985 | Peerman | 15/193 |
| 4,635,313 | 1/1987 | Fassler et al. | 15/193 |

Primary Examiner—Edward L. Roberts
Attorney, Agent, or Firm—Hopgood, Calimafde, Kalil, Blaustein & Judlowe

[57] ABSTRACT

A cleaning implement is disclosed, such as a mop, comprising a lengthwise arrangement of a bunch of strips made of absorbing material, wherein an end portion of said lengthwise bunch of strips is compressed together with the opposite end of said bunch of strips remaining free, said compressed portion having an injection molded core of thermoplastic resin penetrating said compressed portion and peripherally surrounding said compressed end of strips.

5 Claims, 1 Drawing Sheet

CLEANING EQUIPMENT SUCH AS A MOP, MADE OF STRIPS OF ABSORBING MATERIAL

DESCRIPTION

A first object of the invention is a process for the formation of a cleaning implement, such as a mop implement made up of strips of absorbing material or other strips or bristles clenched or tightened between them.

According to the invention, a bunch of said strips (or other) is clenched at one end and said end is introduced into a mould for the injection of synthetic resin under pressure; with the mould being closed, a clenching and anchoring core of said strips (or other) is formed. Said core ensures the connection with the handle for usage.

The core is advantageously moulded with a plurality of injection directions from the periphery towards the inside of the core and balanced; thereby ensuring the centering and anchorage of the bunch of strips in the core.

A further object of the invention is an apparatus for carrying out the above process, which substantially comprises: a device for temporarily clenching the ends of a bunch of strips made of absorbing (or other) material; a mould that can be opened and is able to receive in its cavity the clenched ends of said bunch of strips and to close up so as to clench said bunch of strips by itself; and in said mould, a plurality of injection orifices so distributed so as to inject thermoplastic resin in a balanced manner, to ensure the centering of said clenched ends and their anchorage.

The mould cavity may be shaped to create, on the core, means for the engagement with a handle having a body for the covering and engagement of said core. Alternatively, the mould cavity may be shaped to directly create the core with a finishing shape and a seat for a stick or other handling member.

Another object of the invention is a cleaning implement—such as a mop implement with a plurality of strips made of absorbing material or bristles, formed by the process and an apparatus as above defined, that is, having a core of injection-moulded thermoplastic resin, which clenches and anchors the ends of the strips or bristles or other. Said core may be coupled to a fitting for the handle or, alternatively, said core may create a finishing shape with a coupling for a stick or other handling member.

Through the above defined process and apparatus, an implement can be realized having particularly simple construction and with substantial economy, and above all, it is possible to realize an improved mechanization and thus an advanced automation of the operations for the formation of said implement so as to realize a manufacturing line which is in practice completely automated.

The invention will be better understood by following the description and the attached drawing, which shows a practical, non-limitative exemplification of the same invention. In the drawing.

Figure 1:
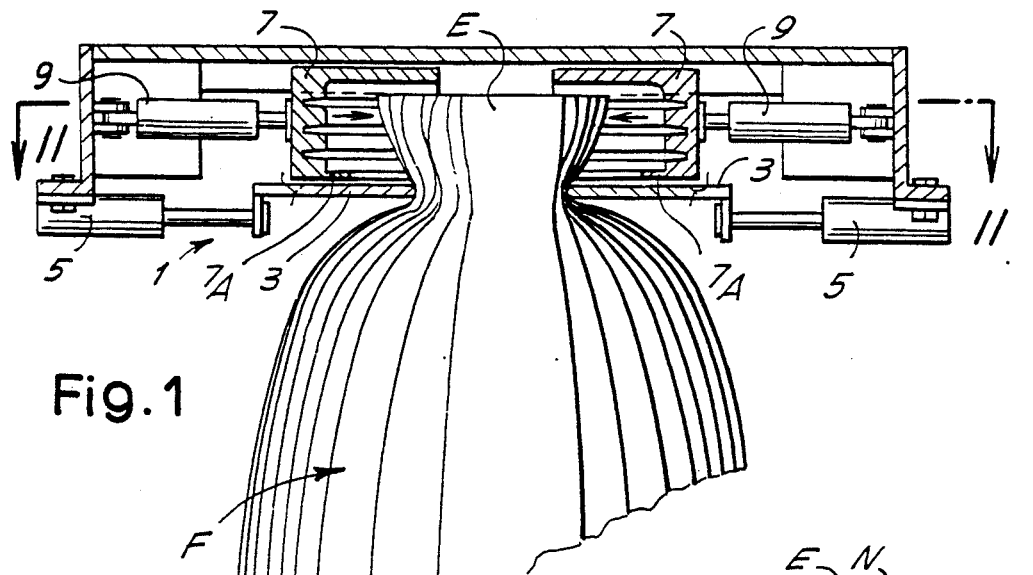
FIG. 1 shows schematically an open mould with a bunch of strips, bristles or other articles, clenched and positioned therein.

According to what is roughly illustrated in the attached drawing, numeral 1 indicates an apparatus for clenching a bunch F of strips with ribbons of flexible absorbing material of the type utilized as absorbent cloths also in houseworks. The bunch F may be realized with strips all of the same type or even with a portion of strips of one type and another portion of strips of a different type in order to obtain a dual functionality of the implement. The clenching apparatus 1 comprises at least two fork-like or otherwise shaped clenching members 3 to embrace the bunch of strips F which is introduced between said two wide open, that is, divaricated members 3 in order to clench circularly in a more or less homogeneous and uniform manner, according to an arrangement like that shown in FIG. 1, wherein the ends E of strips result clenched by said two members 3 of the apparatus 1; the operation of members 3 may be carried out by fluid-driven means 5, mostly of hydraulic or other equivalent type. The apparatus 1 may be separated from or advantageously associated with the moulding apparatus.

The moulding apparatus comprises in practice two substantially symmetrical parts of mould 7, which can be closed so as to engage, through an edge 7A, the bunch of strips F just next to the clenching zone E obtained by members 3 of the apparatus 1; as to the rest of mould 7, this can remain completely closed for the injection, while in the zone of the edges 7A, the clenching ensures a sufficient seal in cooperation with the clenched strips. Numeral 9 indicates a means, shown in an illustrative and summary way, for opening and closing mould 7.

Figure 3:
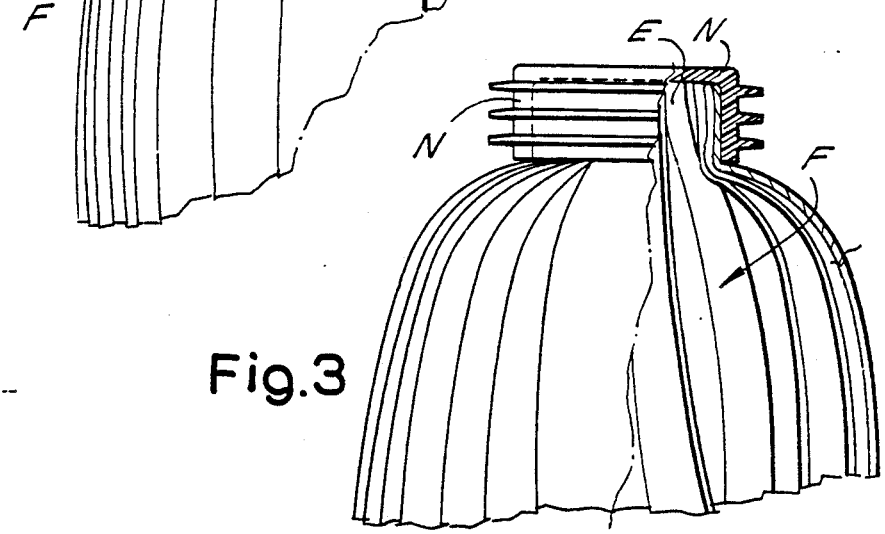
FIG. 3 shows a partially sectioned view of an implement with a core, as it can be obtained by the apparatus of FIG. 1.
Figure 2:
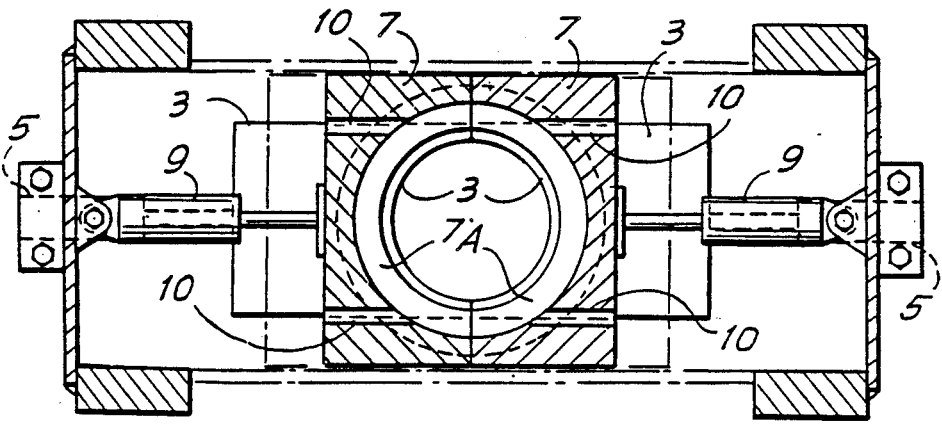
FIG. 2 is a partial section view taken on line II—II of FIG; 1.

As can be seen in particular in FIG. 2, the two mould parts have injection orifices, that is nozzles, 10 which are distributed around the axis of the closed mould, in such a way that the material, being injected under strong pressure and plasticized, goes into the mould with a substantially balanced distribution and thereby acts on the clenched ends E of the bunch F in a substantially balanced manner, so that these ends E remain substantially centered within the cavity of the mould filled with injected thermoplastic material. A core N is thus formed—shown in detail through a view and a section in FIG. 3—which embodies the ends E of strips of bunch F and is also capable of penetrating under pressure in particular between said strip ends, and even inside the material of the strips in some particular conditions and with certain particular qualities of the material of the strips and of thermoplastic material used. In any case, the core N injected onto the ends E held inside the mould ensures a stable anchorage of the ends of bunch of absorbent and flexible strips or bristles.

The core N may be formed in the outside so as to be coupled firmly to a covering and finishing body having a seat for a stick handle or the like. Alternatively, the core N may be formed so as to be removably screwed or bayonet or otherwise jointed on a body even making part of the recoverable handle, whereby the core N with the bunch F represents a spare part for the unit whose utilization of the covering and finishing body, as well as of the stick is thus prolonged. Still alternatively, the core N may itself be structured as a covering body, aesthetically shaped and presenting a joint seat for the stick.

In the illustrated example, the realization of a brush-like cleaning implement is provided, having a longitudinal axis of symmetry. Implements of different configuration may be realized by the described system, for example broom cores with bristles disposed according to an elongate, fan-wise arrangement, the core being correspondingly elongate so as to be received into a correspondingly elongate mould to form the shoulder or other connection means of the bristles and that may be then coupled to a handle and a possible finishing body of the broom.

The described process and apparatus allow—as already stated—a simplification of the operations for the formation of the implement and even a more or less advanced automation of the manufacturing process.

It is understood that the drawing shows an exemplification given only as a practical demonstration of the invention, as this may vary in the forms and dispositions without nevertheless departing from the scope of the idea on which the invention is based.

I claim:

1. A cleaning implement comprising:
   a lengthwise arrangement of a bunch of strips made of absorbing material, one end of said lengthwise bunch of strips being compressed together with the opposite end of said bunch remaining free, and
   an injection-molded core of thermoplastic resin material peripherally surrounding said compressed end of strips,
   said core of thermoplastic resin material being produced by injection molding while an end of said bunch of strips is compressed peripherally by clenching means (1, 3, 5) cooperatively associated with an injection mold, said mold including a plurality of orifices (10) distributed about said compressed strips, such that the resin injected under pressure from the orifices penetrates throughout the compressed ends of said bunch of strips and also forms a core which peripherally surrounds and anchors said compressed strips together while the opposite end of said bunch of strips remain freely extending.

2. The cleaning implement of claim 1, wherein the core is configured such as to provide a fitting for a handle.

3. The cleaning implement of claim 1, wherein the core is configured to be removably joined to a handle.

4. The cleaning implement of claim 1, wherein the core is configured to provide a screw connection with a handle.

5. The cleaning implement of claim 1, wherein the implement is a mop.

* * * * *